May 5, 1964     P. BERTELL ETAL     3,132,201
OUTBOARD REAR VISION MIRROR FOR TRUCKS AND THE LIKE
Filed Feb. 24, 1961     2 Sheets-Sheet 1

INVENTORS
Paul Bertell
Jerome B. Friedenberg
Angelo V. Palermo
by Popp and Sommer
ATTORNEYS.

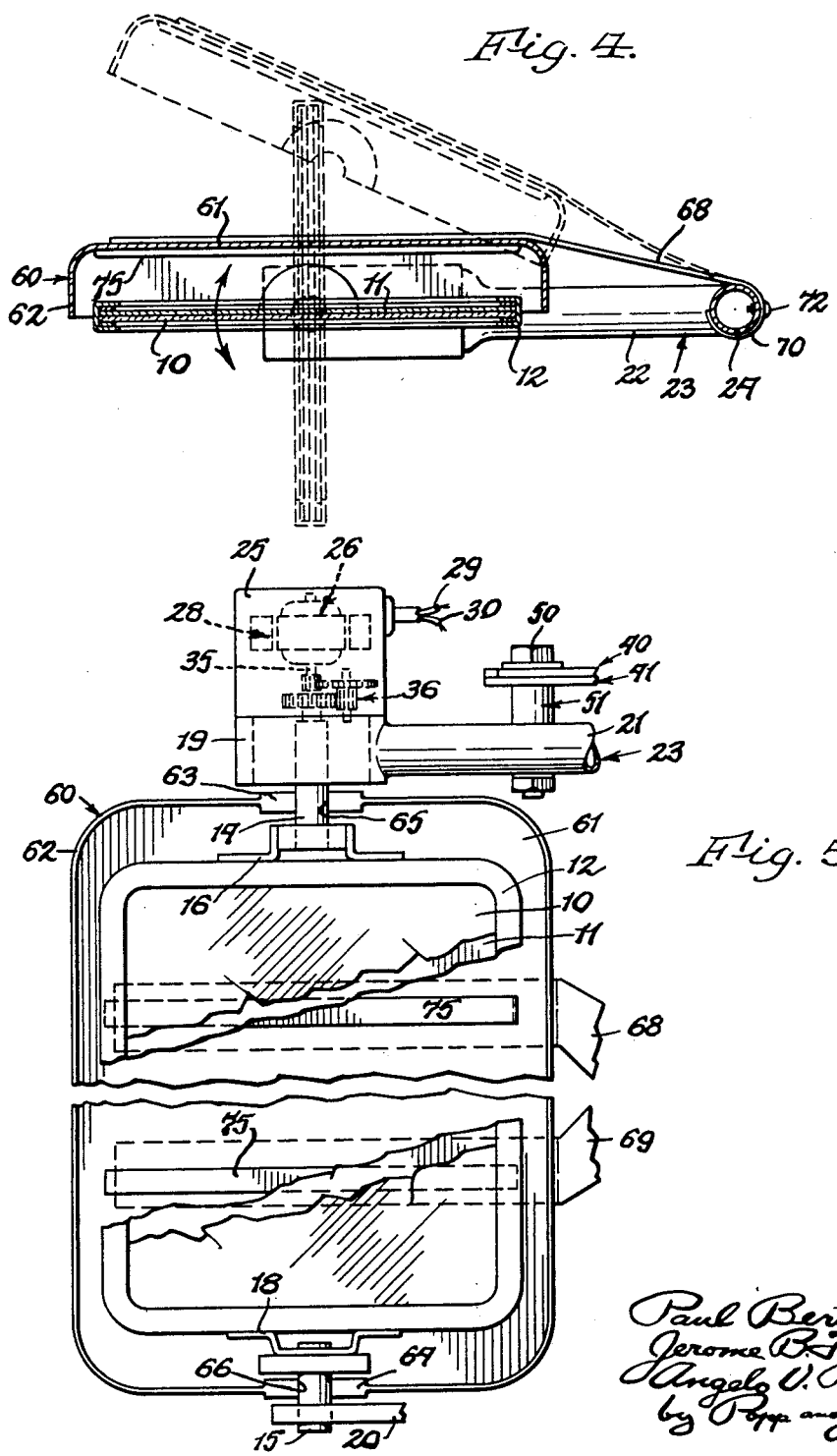

United States Patent Office 3,132,201
Patented May 5, 1964

3,132,201
OUTBOARD REAR VISION MIRROR FOR
TRUCKS AND THE LIKE
Paul Bertell, Williamsville, Jerome B. Friedenberg, Amherst, and Angelo V. Palermo, Williamsville, N.Y., assignors to Standard Mirror Company, Inc., Buffalo, N.Y., a corporation of New York
Filed Feb. 24, 1961, Ser. No. 91,521
2 Claims. (Cl. 88—98)

This invention relates to an outboard rear vision mirror for trucks, trailers and like commercial vehicles and more particularly to such a rear vision mirror for such vehicles having very wide bodies in relation to the width of the cab so that the rear vision mirror must be mounted a great distance from the cab in order to clear the wide body and obtain an unobstructed view of the roadway in rear of the body. When this is done, the mirror panel must be of large size in order to give the driver in the cab an adequate view of the roadway behind. Further the rear vision mirror is out of convenient reach for aiming the same by the driver seated in the cab. Also difficulties are encountered in providing a mirror panel adjustable to have a high degree of reflectivity for daytime use and a lower degree of reflectivity for night use, such lower degree of reflectivity at night serving to dim the reflection of headlights from following automobiles and thereby avoid the reflection of strong glaring light into the eyes of the truck driver.

An important object of the present invention is to provide a rear vision mirror which can be aimed by the driver while seated in the cab, such remote controlled aiming being achieved by means of a reversible motor rotating the mirror panel under control of the seated driver.

Another object is to provide such a rear vision mirror which can be adjusted to have either a high or low degree of reflectivity thereby to adjust it to optimum daytime and night driving use.

Another object is to provide such a rear vision mirror which can be shifted to have either a high or low degree of reflectivity by the driver while seated in the cab.

Another object is to provide both for aiming the mirror panel and also adjusting its degree of reflectivity by the same reversible motor under remote control by the seated driver.

Another important object is to provide such a rear vision mirror which is adjustable to have different degrees of reflectivity and which is adequately hooded to be adequately protected from mud, bugs and stones from in front of the car and augmented by the foreward travel of the truck.

Another important aim is to provide such a hood for a mirror adjustable to different degrees of reflectivity which does not substantially add to the area of view necessarily blocked off by the rear vision mirror panel itself and hence does not create what is commonly called a blind spot in the view of the driver at the side of his cab.

Another aim is to provide such a rear vision mirror which is adequately supported and in particular free from objectionable vibrations as would interfere with a clear vision.

Another aim is to provide such a rear vision mirror which is simple in construction and low in cost and will stand up under conditions of severe and constant use without getting out of order or requiring repairs.

Other objects and advantages of the invention will be apparent from the following description and drawings in which:

FIG. 4 is an enlarged horizontal section taken generally on line 4—4, FIG. 1 and illustrating the manner in which the mirror is turned from a position of high reflectivity to a position of low reflectivity.

FIG. 5 is an enlarged view similar to FIG. 1 and showing parts of the mirror in greater detail.

Figure 1:
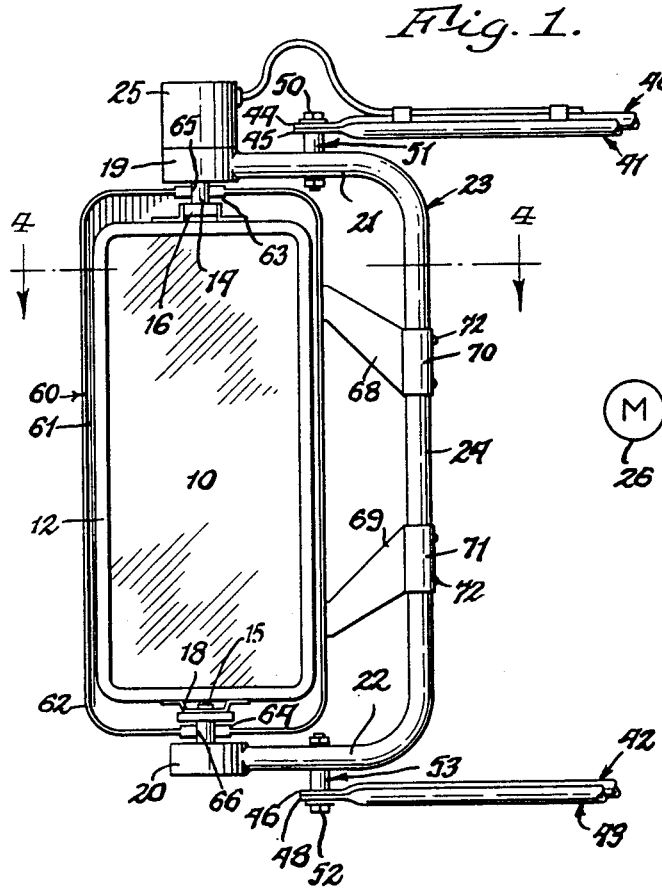
FIG. 1 is an elevational view of an outboard rear vision mirror for trucks embodying the present invention, only a part of the supporting structure for the rear vision mirror being illustrated.

The outboard truck mirror of the present invention is shown as comprising two reflective mirror panels 10 and 11 which are shown as being of vertically elongated generally rectangular form and arranged back to back as illustrated in FIG. 4. One of these panels, such as the panel 10, is a mirror of high reflectivity, such as would be used during the daytime to obtain the brightest view of the roadway in rear of the vehicle on which the rear vision mirror is mounted. The other mirror 11 has its reflectivity reduced to a desirable level for night use, this being for the purpose of eliminating the glare from the headlights of vehicles following the truck on which the mirror is mounted. The high and low reflectivity panels 10 and 11 are shown as contained within a frame 12 of channel form in cross section, the marginal portions of the reflective panels 10 and 11 being suitably mounted in the inwardly opening channel of this frame.

The framed mirror panels 10, 11 are rotated 180° about a vertical axis in order to change reflectivity of the rear vision mirror and for this purpose coaxial upper and lower studs 14 and 15 are suitably fixed to brackets 16 and 18 at the top and bottom of the mirror frame and are suitably journalled in bearings 19 and 20 at the outboard ends of the horizontal arms 21 and 22 of a U-shaped bracket indicated generally at 23, this U-shaped bracket preferably being of tubular form in cross section and having a vertical part 24 connecting corresponding ends of the upper and lower arms 21, 22.

Figure 3:
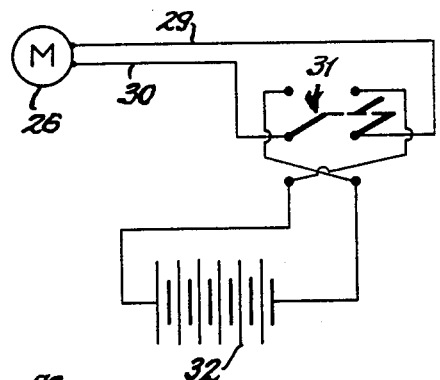
FIG. 3 is a wiring diagram of a suitable electrical circuit.

The upper bearing 19 supports an inverted cup-shaped shell 25 housing an electric motor 26. The drive shaft of this motor is operatively connected to the upper stud 14 of the framed mirror panels 10, 11 so as to turn the framed mirror panels in either direction about the vertical central axis of the studs 14, 15. While the motor can be of any suitable form, it preferably has a permanent magnet field, the permanent magnets being indicated at 28, so that by the use of two supply wires 29 and 30, the motor can be reversed. This reversal is shown as obtained through a double pole double throw switch 31 connecting the motor with the automobile battery 32 in the manner shown in FIG. 3. The drive shaft 35 of the motor is shown as connected by reducing gearing 36 with the stud 14 so as to turn the latter and thereby rotate the framed mirror panels 10, 11 about a vertical axis.

Figure 2:
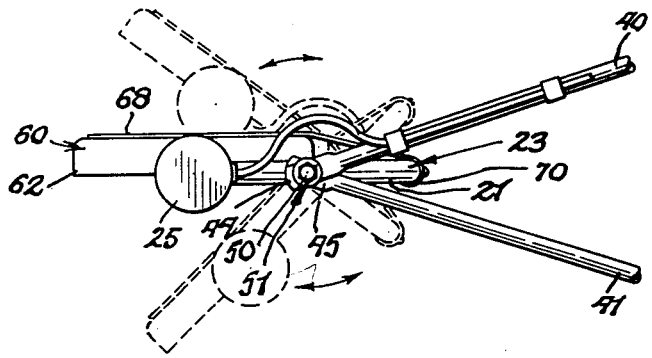
FIG. 2 is a top plan view thereof and showing in dotted lines various positions in which the rear vision mirror can be manually placed.

The rear vision mirror as above described is mounted on the truck cab a substantial distance outboard therefrom, this being necessitated by the width of the truck or trailer body behind the cab, it being necessary, of course, that the rear vision mirror project a substantial distance beyond the body in order to obtain a view of the roadway in rear of the body. The structure for so supporting the rear vision mirror from the cab at a substantial distance outboard therefrom can be of any usual and well-known construction and is shown as including a pair of upper tubular arms 40, 41 and a pair of lower tubular arms 42, 43 each of these pairs being arranged generally in a common horizontal plane with the bars in angular relation to each other as illustrated in FIG. 2 and having flattened ends 44, 45, 46 and 48 in overlapping relation to each other. The flattened ends 44, 45 of the upper pair of arms 40, 41 carry the vertical bolt 50 of an upper friction joint 51 connecting the center part of the upper arm 21 of the U-shaped tubular bracket 23 with the outboard ends 44, 45 of the upper pair of supporting structure arms 40, 41. Similarly, a vertical bolt 52 forms part of a lower friction joint 53 arranged coaxially with the upper friction joint 51 and pivotally connecting the central part of the lower arm 22 of the tubular U-shaped bracket 24 with the flattened ends 46, 48 of the lower pair of supporting arms 42, 43.

It is important to provide a case or housing for the framed reflective mirror panel 10, 11 which encloses the side thereof facing the roadway in front of the vehicle in order to protect the forwardly facing mirror panel 10 or 11 from mud, bugs and flying stones which would seriously impair the utility of the mirror panel when shifted from one condition of reflectivity to the other. It is apparent that such a housing could be achieved by fixing a semicylindrical hood to the upper and lower arms 21, 22 of the U-shaped tubular bracket 23 and arranging the framed mirror panel 10, 11 coaxially within this housing so as to be capable of rotating about a vertical axis and capable of being so positioned so that one of its reflective panels 10 or 11 is visible from the truck to reflect a view of the roadway in rear of the body while the other reflector panel is enclosed and protected by this semicylindrical housing. However, such a semicylindrical housing would not only be extremely bulky and undesirable in appearance but also would constitute a distinct hazard in blocking off a large section of the visibility of the driver to the side of his vehicle and hence produce a dangerous blindspot.

To avoid such an unsightly housing and the production of such hazardous blindspot for the driver of the vehicle, the housing of the present invention, comprises a shallow pan-like sheet metal housing indicated generally at 60 having a vertical substantially flat or planar wall 61 of generally rectangular form and somewhat larger than the rim 12 of the mirror panels 10, 11 and as having a shallow marginal rim 62 projecting toward the rear of the vehicle and adapted to be brought into encircling relation with the rim 12 of the rear vision mirror panels 10, 11. The upper and lower portions of the rim 62 are shown as carrying stops or rests 63, 64 the former having a semicircular notch or groove 66 adapted to bear against the lower stud 15. These grooves are yieldingly held in engagement with these studs by a pair of spring leaves 68, 69 which are suitably secured to the housing 60 and project horizontally from one side thereof and have anchoring portions 70, 71 embracing the vertical part 24 of the U-shaped tubular bracket 23 and fixed thereto as by bolts 72.

This mounting of the casing 60 on the spring arms or leaves 68, 69 permits the framed mirror panel to push it out of the way when the motor 26 is energized to rotate the mirror about the vertical axis of its studs 14 and 15. For this purpose, horizontal wear strips 75 of nylon or the like can be secured in any suitable manner, as by cement, to the inside of the vertical flat or planar wall 61 of the mirror case 60, the rim 12 of the reflective mirror panel 10, 11 bearing against and travelling along these nylon strips 75 while the mirror panel 10, 11 is so rotated.

In the use of the mirror as above described, the supporting structure, of which the tubular bars 40–43 is shown, is secured to the cab of the truck or tractor so as to project a substantial distance outwardly from the cab in order to locate the mirror panel 10, 11 far enough outboard to clear the wide body of the truck or trailer and provide an unobstructed view of the roadway in rear of the vehicle. With the rear vision mirror assembly so arranged, the operator can manually adjust the mirror so as to aim it by grasping the vertical part 24 of the U-shaped tubular bracket 23 and turning it about the axis of the friction joints 51, 53 so as to position the mirror panel as may be desired. In FIG. 2 is illustrated, by means of broken and full lines, three different positions of manual adjustment of the rear vision mirror panel 10, 11 about the axis of the friction joints 51, 53.

If the driver of the truck requires a finer adjustment of the aim of the mirror panel, he can obtain this by manipulating the double pole double throw switch 31 so as to drive the reversible motor 26 in a direction to obtain such fine adjustment of the aim of the mirror panel 10, 11. This energization of the motor 26, through the reduction gearing 36, turns the upper stud 14 of the framed mirror panel 10, 11 about its vertical axis thereby to rotate the mirror panel about this axis and adjust its aim as may be required. This movement of the mirror panel in either direction about its vertical central axis is indicated by the double headed arrow in FIG. 4 and it will be noted that because of the space provided between the flat or planar rear wall 61 of the protecting case 60 a substantial amount of such movement of the framed mirror panel is permitted before the frame 12 of the mirror panel engages this case. The reversibility of the motor 26 permits of very accurately aiming the mirror panel by the driver while seated in the cab in the position from which the rear vision mirror is used.

When the driver desires to render operative one or the other of the mirror panels 10 or 11, say, in shifting from the use of the high intensity reflective panel 10 to the low intensity reflective panel 11, all that he is required to do is to close the switch 31 so as to energize the motor 26. Energization of the motor 26, through the reduction gearing 36, turns the upper stud 14 fixed to the frame 12 of the mirror panel 10, 11 so as to rotate this mirror panel about the vertical axis of the studs 14, 15. Such rotation of the mirror panel 10, 11 causes its frame 12 to engage the ends of the nylon strips 75 inside the protecting case 60 and to bear against these nylon strips 75. Since the protecting case 60 is mounted on the spring arms or leaves 68, such pressure of the rim 12 of the mirror panel 10, 11 causes the protecting case 60 to move forwardly with reference to the vehicle, the leaf springs 68, 69 acting in the manner of hinge leaves to permit such movement. In such movement, the semicircular notches or grooves 65, 66 leave contact with the studs 14, 15 and the protecting case 60 comes to the dotted line position illustrated in FIG. 4. When the rim 12 of the reflective panel 10, 11 passes beyond the centers of the nylon strips 75, the engaged side of the rim 12 retreats and permits the leaf spring 68, 69 to return the protective case 60 toward its operative position illustrated by full lines in FIG. 4. When the mirror pane 10, 11 has been rotated 180°, the grooves or notches 65, 66 re-engage the studs 14, 15 and the parts are in position originally assumed with the reflective panel 11 of reduced intensity being in operative position facing the roadway and rear of the vehicle instead of the mirror panel 10 of high reflectivity.

From the foregoing, it will be seen that the present invention provides a rear vision mirror particularly adapted for outboard use with trucks in which the mirror panel can be readily aimed by the driver while seated in the cab and that while so seated, the driver can also readily change the mirror panel from a condition of high reflectivity, as for daytime driving, to a position of low reflectivity, as for nighttime driving. It will further be seen that the case 60 adequately protects the mirror panel against flying mud, bugs and stones from the front of the vehicle but at the same time does not materially decrease the direct visibility occasioned by the presence of the rear vision mirror panel and does not interfere with the fine adjustment of the aim of the rear vision mirror panel by the driver while seated in the cab.

What is claimed is:
1. An outboard rear vision mirror for trucks and the like, comprising a supporting structure, a vertically disposed rear vision mirror panel having reflective faces of different degrees of intensity on its opposite vertical sides, means rotatably supporting said mirror panel on said supporting structure for rotation about an upright axis, a shield generally parallel with and covering one side of said mirror panel in closely spaced relation thereto to protect said one side of said mirror panel from mud, bugs and stones, means yieldingly supporting said shield on said supporting structure for horizontal movement toward and from said axis, and means for rotating said mirror panel about said axis, the rim of said mirror panel in such rotation engaging said shield and pushing said shield away from said axis.

2. An outboard rear vision mirror for trucks and the like, comprising a supporting structure, a vertically disposed rear vision mirror panel means having reflective faces of different degrees of intensity on its opposite vertical sides, means rotatably supporting said mirror panel means on said supporting structure for rotation about an upright axis, a shield covering one side of said mirror panel means in closely spaced generally parallel relation thereto to protect said one side of said mirror panel means from mud, bugs and stones, means yieldingly supporting said shield on said supporting structure for horizontal movement toward and from said axis, a plurality of horizontal wear strips on the side of said shield facing said mirror panel means, and means for rotating said mirror panel means about said axis, the rim of said mirror panel means in such rotation engaging and travelling along said wear strips and pushing said shield away from said axis.

References Cited in the file of this patent

UNITED STATES PATENTS

| | | |
|---|---|---|
| 1,887,706 | Bettman | Nov. 15, 1932 |
| 2,746,354 | Barkley | May 22, 1956 |
| 2,969,715 | Mosby | Jan. 31, 1961 |
| 3,005,384 | Baird et al. | Oct. 24, 1961 |
| 3,075,431 | White | Jan. 29, 1963 |